United States Patent [19]

Briley et al.

[11] Patent Number: 4,612,780
[45] Date of Patent: Sep. 23, 1986

[54] APPARATUS FOR AIR TREATING ARTICLES CARRIED ON A SPIRAL CONVEYOR

[75] Inventors: George C. Briley; Peter Y. M. Pao, both of San Antonio, Tex.

[73] Assignee: Refrigeration Engineering Corporation, San Antonio, Tex.

[21] Appl. No.: 811,340

[22] Filed: Dec. 20, 1985

[51] Int. Cl.$^4$ .............................................. F25D 25/02
[52] U.S. Cl. ........................................ 62/381; 62/303
[58] Field of Search .................... 198/771; 62/381, 63, 62/303

[56] References Cited

U.S. PATENT DOCUMENTS

| | | | |
|---|---|---|---|
| 3,443,505 | 5/1969 | Kaufman, Jr. ......................... | 62/381 |
| 3,688,518 | 9/1972 | Goltos .................................... | 62/63 |
| 3,769,805 | 11/1973 | Corini .................................... | 62/381 |
| 4,078,394 | 3/1978 | Chamberlain et al. ............... | 62/381 |
| 4,103,768 | 8/1978 | Persson ................................. | 62/381 |
| 4,315,414 | 2/1982 | Ibrahim ................................. | 62/303 |
| 4,324,110 | 4/1982 | Lovette, Jr. et al. ................. | 62/381 |
| 4,480,535 | 11/1984 | Jaxmar et al. ........................ | 62/381 |

Primary Examiner—Ronald C. Capossela
Attorney, Agent, or Firm—Watson, Cole, Grindle & Watson

[57] ABSTRACT

An apparatus for the air treating of articles such as comestibles carried on a spiral conveyor has air deflecting baffles, and the housing in which the conveyor is mounted has air reentrant chambers associated with the baffles so that the flow of air through the housing traverses the belt when impeded from flowing directly through the belt by large articles to be cooled or frozen lying thereon.

2 Claims, 4 Drawing Figures

APPARATUS FOR AIR TREATING ARTICLES CARRIED ON A SPIRAL CONVEYOR

BACKGROUND OF THE INVENTION

This invention relates generally to an apparatus for the air treating of articles, such as comestibles carried on a spiral conveyor, and more particularly to such an apparatus having centrally located, axially spaced air deflecting baffles for confining the flow of air directly through successive turns of an endless, foraminous conveyor belt when the articles supported thereon have such a predetermined small size as to permit the free flow of air directly through the belt. Otherwise, the baffles deflect the flow of air in lateral directions across the articles carried on successive turns of the belt from a central opening formed by the belt, into reentrant chambers of a cylindrical housing in which the conveyor belt is mounted, and laterally back to the central opening in a zig-zag path over the articles supported on the belt when the article size is greater than the aforementioned small size so as to impede flow of air directly through the successive turns of the belt.

Typically, in an apparatus for cooling or freezing articles supported on a spiral conveyor, the conveyor is confined within the airflow path such that the supported articles to be cooled or frozen may impede the free flow of air through the successive turns of the belt from one side thereof to the other during conveyor movement. All the products may therefore become unevenly or incompletely cooled or frozen, which is undesirable, which affects the quality of articles frozen or cooled as well as the efficiency of the cooling system.

SUMMARY OF THE INVENTION

It is therefore an object of the present invention to provide an apparatus for the air treating of articles, such as comestibles, carried on in endless foraminous conveyor belt supported within an upstanding cylindrical housing mounted within a cooling chamber, and baffles together with air reentrant chambers of the housing facilitating the flow of air to traverse the successive turns of the conveyor belt when the supported articles are so large as to impede the flow of air directly through the belt, the baffles otherwise confining the flow of air directly through successive turns of the belt when the articles are so small as not to impede the flow of air therethrough.

Another object of this invention is to provide such an apparatus wherein the central opening formed by the endless belt contains a plurality of such baffles which are axially spaced and extend transversely of the housing, the air reentrant chambers being annular and opening into the belt and being associated with the baffles.

A further object of this invention is to provide such an apparatus wherein the baffles have upwardly facing conical surfaces and an overall size substantially equal to the central opening, and liquid cleaning means provided in the cooling chamber for spraying the belt with a liquid cleaner when it becomes desirable to clean the interior of the housing, the conical surfaces of the baffles providing liquid run-off during the cleaning operation.

Other objects, advantages and novel features of the invention will become more apparent from the following detailed description of the invention when taken in conjunction with the accompanying drawings.

DETAILED DESCRIPTION OF THE INVENTION

Figure 1:
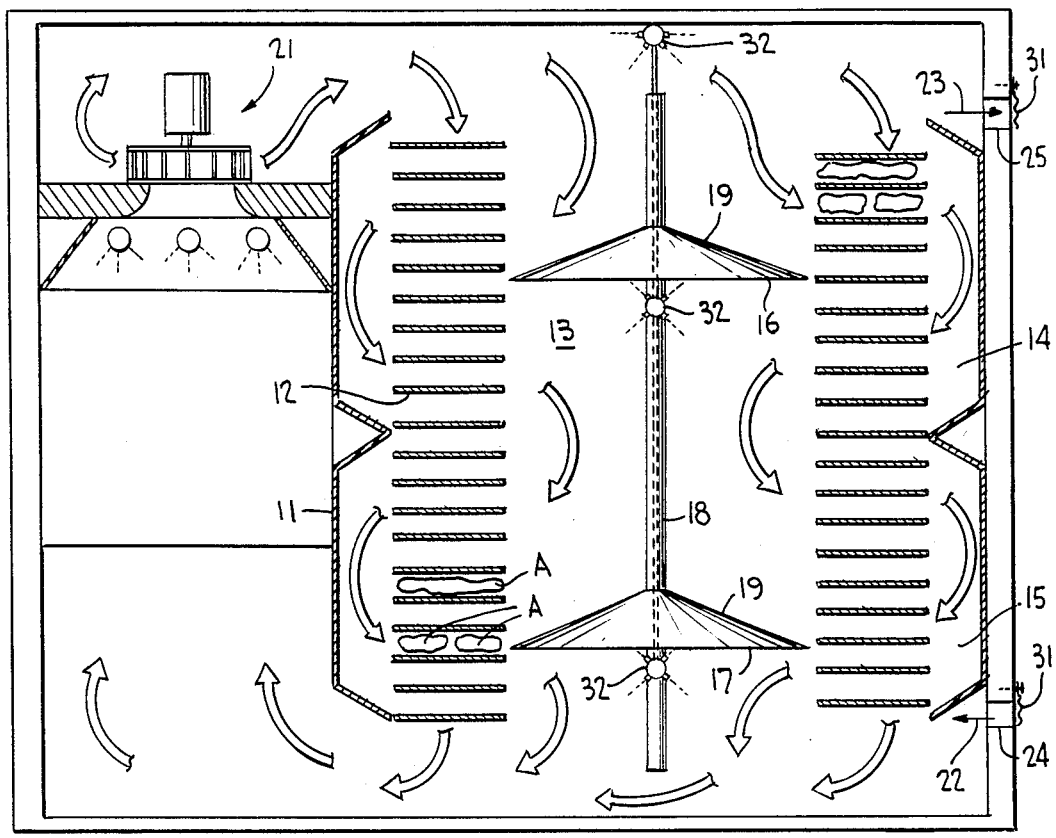
FIGS. 1 and 2 are upright sectional views of the apparatus according to the invention illustrating the flow paths across the successive turns of the conveyor belt for bottom feed and top feed conveyors, respectively.

Turning now to the drawings wherein like reference characters refer to like and corresponding parts throughout the several views, the apparatus of the invention essentially comprises a freezing plant for comestibles and the like, and includes a cooling chamber 10 having an upstanding, open-ended cylindrical housing 11 mounted therein. An endless foraminous conveyor belt 12 is supported within the housing in any normal manner along a spiral path, the spiral conveyor forming a central opening 13. This opening is typically circular, although maybe out-of-round depending on the shape of the spiral belt. The successive turns of the belt open at the inner and outer peripheries thereof, and housing 11 is formed so as to define internal, annular air reentrant chambers 14, 15 into which the outer periphery of the conveyor belt opens.

A pair of axially spaced, air deflecting baffles 16 and 17 are mounted within central opening 13 of the housing and extend transversely relative thereto. These baffles may be mounted on a central hollow tube 18 forming a conduit for a liquid cleaner for a purpose to be more fully described hereinafter, and each baffle has an overall size and shape substantially the same as that of the central opening. Moreover, each baffle is conically shaped so as to have an upwardly facing conical surface 19.

A continuous freezing/cooling system 21 has one or more plate fin coils which employs a refrigerant to cool the air. One or more centrifugal fans of the open type are employed to circulate the air through the cooling coils. Air velocities and temperatures are variable depending upon the type article to be cooled or frozen. The freezing/cooling system is mounted within the cooling chamber for directing air through one end of the housing and for causing it to exit through its opposite end, as shown by the air flow directional arrows in FIG. 1. The FIG. 1 apparatus is a bottom-fed freezer having a bottom feed section 22 and a top discharge section 23 such that articles A may be bottom fed through opening 24 into the spirally extending path of the conveyor belt, and may be discharged through an opening 25 from the chamber in a manner known in this art. Thus, the apparatus operates according to the counter-current principle, such that the air flows from the top downwardly through the housing while the articles progress from the bottom upwardly by conveyor belt 12.

The outer periphery of the conveyor belt opens directly into chambers 14 and 15, and these chambers are respectively associated with baffles 16 and 17, as shown in FIG. 1. Of course, more than a pair of axially spaced baffles may be provided as each having associated therewith a reentrant chamber such as 14, 15, without departing from the invention.

Assuming that the articles A to be frozen or cooled occupy substantially the entire upper surface of the foraminous conveyor belt on which they are supported so as to impede the flow of cooling air directly through the belt openings, the flow of air for the bottom-fed freezer of FIG. 1 enters the upper end of housing 11 and is prevented by the rather large articles A from flowing directly through the foraminous conveyor belt. Upper baffle 16 deflects the flow of incoming air transversely outwardly therefrom across several of the successive turns of the conveyor located upwardly of this baffle for cooling or freezing the articles A supported thereon. The deflected air stream then enters annular reentrant chamber 14 and is thereby caused to flow transversely inwardly through several successive turns of the conveyor for cooling or freezing the large articles supported thereon, after which the flow of air is then caused by baffle 17 to change its direction and be deflected outwardly from the central opening, through several lower successive turns of the belt for cooling or freezing the articles supported thereon and into annular reentrant chamber 15 in which the air reverses its direction to now flow through several lowermost successive turns of the belt back into the central opening below baffle 17 for cooling or freezing the products supported thereon, and out through the exit end of the housing, all as shown by the directional air flow arrows of FIG. 1. Thus, an essentially zig-zag flow path is defined for the moving air, and the rather large articles A supported on the belts are all completely cooled or frozen uniformly so as to assure high quality cooled or frozen articles being moved on the conveyor belt from the bottom feed end to the upper discharge end of the apparatus.

Figure 2:
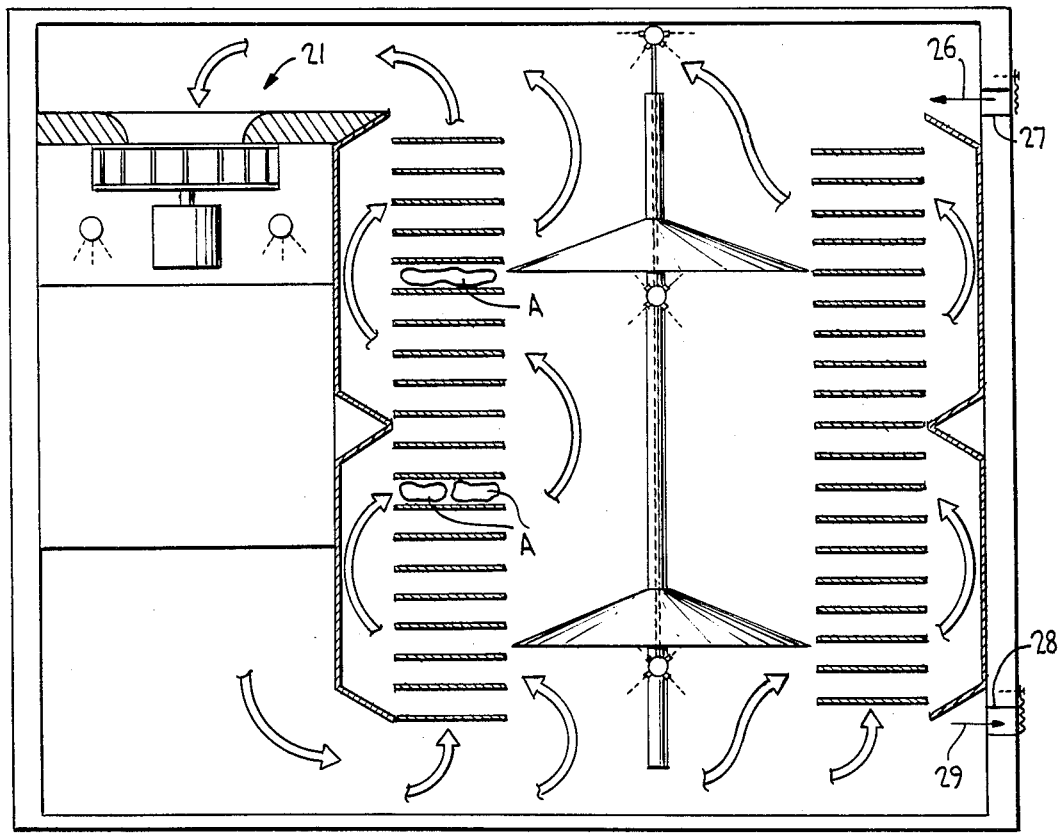

The apparatus of FIG. 2 is essentially the same as that described with reference to FIG. 1 except that it comprises a top-fed freezer in which the articles to be cooled or frozen are continuously fed onto the spiral conveyor at a top feed section 26 through an opening 27 in the housing, and are discharged from the housing through an opening 28 at a bottom-discharge section 29. For this purpose, air cooling system 21 is inverted relative to that of FIG. 1 for directing the flow of air through the bottom end of the housing so as to exit from the top end thereof in the same zig-zag pattern described for FIG. 1 and in a direction counter to the movement of articles A through the housing by the spiral conveyor.

Figure 3:
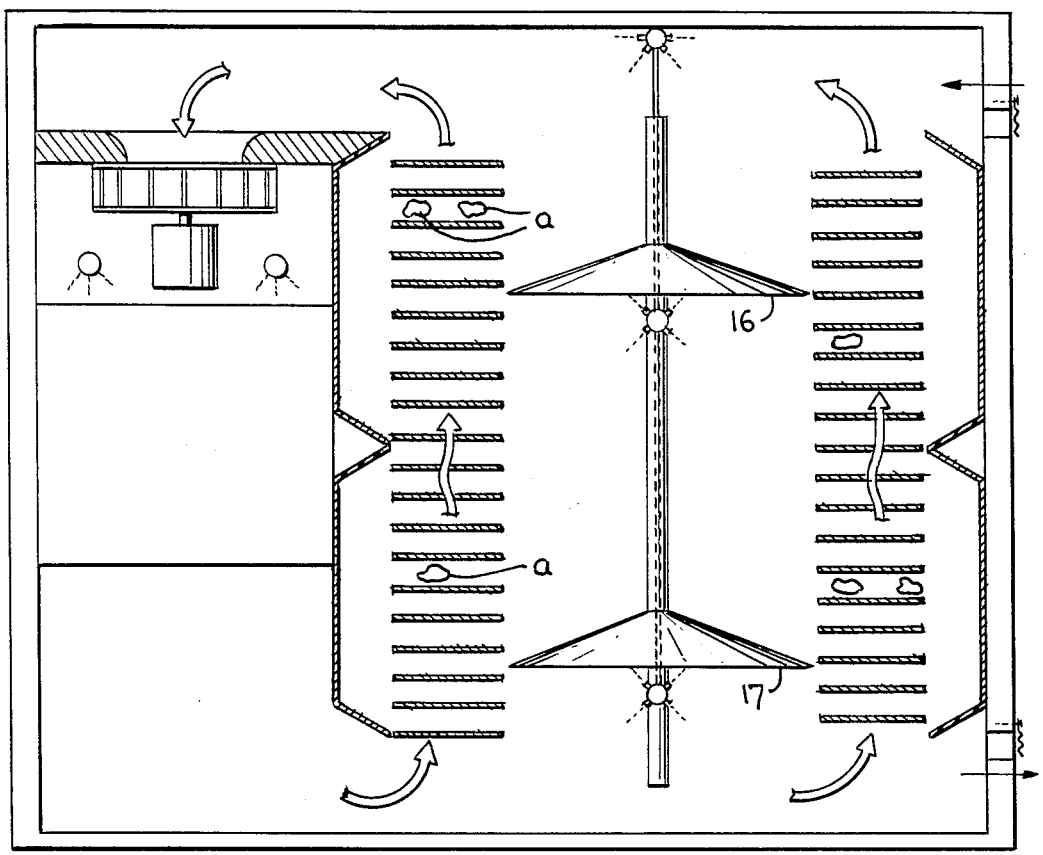
FIGS. 3 and 4 are views similar to FIGS. 1 and 2 of the same apparatus according to the invention illustrating the flow paths directly through the successive turns of the belt for top feed and bottom feed conveyors, respectively.

The FIG. 3 apparatus is identical to that shown in FIG. 2 except that articles a supported on successive turns of the foraminous conveyor belt are of a smaller size compared to articles A such that articles a do not impede the flow of cooling air directly through the conveyor belts. Thus, air cooling system 21 causes the air to flow through the bottom end of the housing and to exit from the top end thereof as the air moves directly through the conveyor belt openings unimpeded by the small articles a supported thereon.

Figure 4:
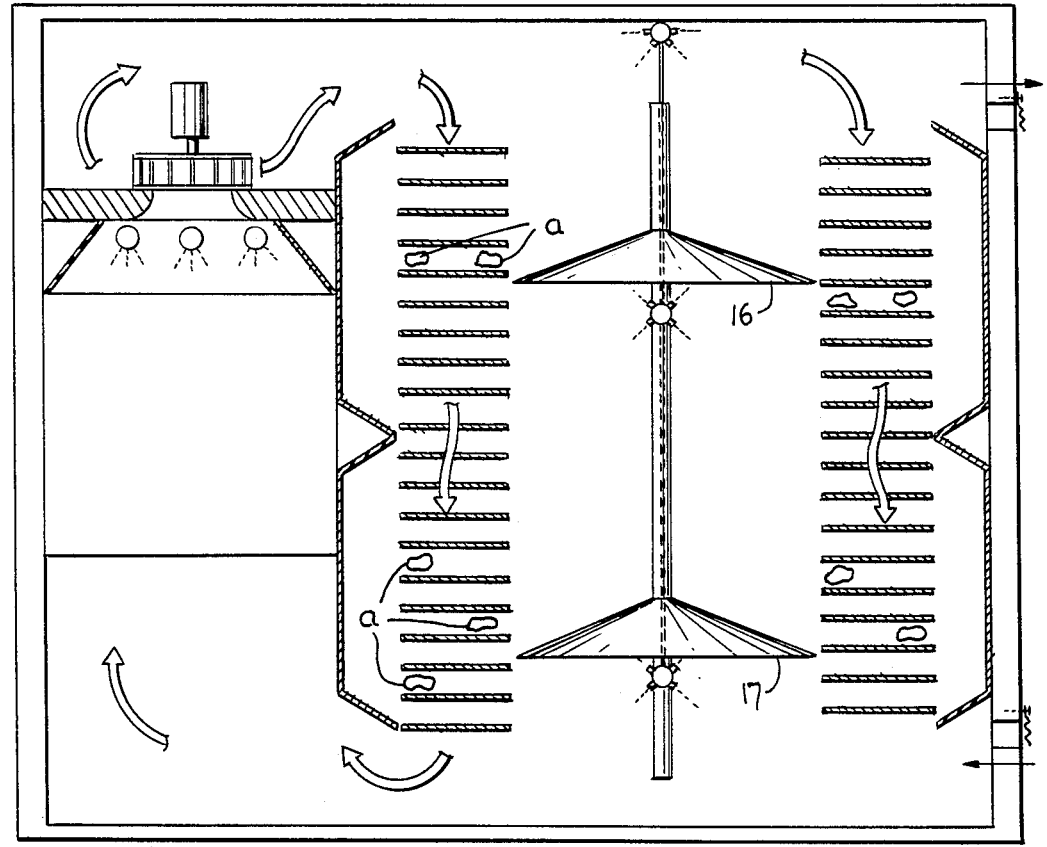

The FIG. 4 apparatus is the same as that of FIG. 1 except that, as in FIG. 3, the articles a to be cooled or frozen are rather small compared to articles A so as not to impede the free flow of air directly through the conveyor belt openings. The air flow paths of FIGS. 3 and 4 are shown by the arrows therein.

Of course, if a mix of larger articles A and smaller articles a are supported on the successive turns of the conveyor belt to be cooled or frozen, a combined direct and zig-zag air flow path of FIGS. 2 and 3 or of FIGS. 1 and 4 will occur.

And, air baffles 31 of flexible material such as plastic or rubber maybe mounted on the cooling chamber wall over the product inlet and discharge passages for limiting the introduction of outside warm air into the freezer without interfering with the incoming and discharged articles A or a. Thus, cooling losses from the freezer are prevented due to the pressure differential inside and outside the freezer.

When the cooling or freezing operation is shut down for cleaning, the conveyor belt surfaces must be typically cleaned manually with a liquid cleaning agent while working within the central opening of the conveyor. The present invention avoids this tedious and oftentimes unreliable cleaning approach by the provision of an automatic conveyor belt cleaning system in which spray nozzles 32 are mounted on or above hollow support tube 18 through which a liquid cleaning agent may be sprayed onto the conveyor belt for both cleaning the belt and the inside of housing 11 as well. Conical upper surfaces 19 of baffles 16 and 17 provide run-off surfaces for the cleaning liquid so as to avoid any collection of cleaning liquid and rinsing water from collecting on the tops of the air deflecting baffles after completion of the cleaning operation.

Obviously, many modifications and variations of the present invention are made possible in the light of the above teachings. It is therefore to be understood that within the scope of the appended claims the invention may be practiced otherwise than as specifically described.

What is claimed is:

1. An apparatus for the air treating of articles, such as comestibles, comprising a cooling chamber having an open ended cylindrical upstanding housing mounted therein, an endless foraminous conveyor belt for the articles supported within said housing along a spiral path forming a central opening, a plurality of axially spaced, air deflecting baffles mounted within said housing in said central opening and extending transversely of said housing, said housing having internal, annular air reentrant chambers opening into said belt and associated with said baffles, means for feeding air through said housing from one end thereof and out through the opposite end of said housing, said baffles confining the flow of air directly through successive turns of said belt when the articles supported thereon have such a predetermined small size as to permit the free flow of air through said belt between opposite sides thereof, and said baffles deflecting the flow of air in lateral directions across the successive turns of said belt from said center opening, into said reentrant chambers and back to said central opening in a zig-zag path when the size of the articles supported on said belt is greater than said predetermined small size so as to impede flow of air directly through said successive turns.

2. The apparatus according to claim 1, wherein said baffles have upwardly facing conical surfaces, and said baffles have an overall size substantially the same as said central opening, and liquid cleaning means in said cooling chamber for spraying said belt with a liquid cleaner, said conical surfaces providing liquid run-off from said baffles.

* * * * *